United States Patent [19]

Sugimura et al.

[11] 4,084,621

[45] Apr. 18, 1978

[54] ACCUMULATOR CONSISTING OF WELDED VESSEL AND LID

[76] Inventors: Kazuo Sugimura; Nobuyuki Sugimura, both of 308 Mabase, Shimizu, Shizuoka, Japan

[21] Appl. No.: 767,752

[22] Filed: Feb. 11, 1977

[51] Int. Cl.$^2$ .............................................. F16L 55/04

[52] U.S. Cl. .......................................... 138/30; 239/89

[58] Field of Search ....................... 138/30, 26; 239/89, 239/96

[56] References Cited

U.S. PATENT DOCUMENTS

| | | | |
|---|---|---|---|
| 2,345,124 | 3/1944 | Huber | 138/30 |
| 2,394,401 | 2/1946 | Overbeke | 138/30 |
| 3,088,492 | 5/1963 | Mercier | 138/30 |
| 3,948,287 | 4/1976 | Sugimura et al. | 138/30 |

*Primary Examiner*—Richard E. Aegerter
*Assistant Examiner*—L. Footland
*Attorney, Agent, or Firm*—Ira Milton Jones & Associates

[57] ABSTRACT

The pressure vessel of a hydraulic accumulator comprises bowl-shaped body and lid members welded together edge to edge, lid member uppermost. A bowl-shaped diaphragm in the vessel having its concave surface facing up is supported by a rigid ring having a large diameter radially outer portion seated on an upwardly facing circumferential shoulder on the body member, near its rim. A smaller diameter radially inner portion of the ring is clinched over a bead around the edge of the diaphragm. The ring also has a frustoconical, upwardly tapering radially intermediate portion connecting its radially inner and outer portions, to hold the rim of the diaphragm at a high level in the vessel.

5 Claims, 3 Drawing Figures

ACCUMULATOR CONSISTING OF WELDED VESSEL AND LID

This invention relates to an improved accumulator to be used as a damper in the circuit of pressure liquid apparatus.

In the conventional accumulators, it was very difficult to mount the diaphragm or gas bladder in the pressure vessel since its handling was very troublesome, and particularly in assembling a pressure vessel by means of welding, the gas bladder was often injured by welding residues inpinged in the vessel when welding was done.

One object of the present invention is to furnish an accumulator that can be easily manufactured with simple structure of parts and quickly assembled without any trouble, yet at low cost.

Another object of the present invention is to temporarily secure a body and lid in alignment and when the body and lid are welded, to form a pressure vessel, to protect the bladder from being injured by welding residues inpinging inside.

Still another object of the present invention is to completely avoid leaking of liquid and gas from the mounted portion of the gas bladder and to avoid displacement of the bladder due to pulling force by providing a flange securing portion at the upper end of a bladder supporting ring, thus to improve security and reliability of the accumulator.

A still further object of the present invention is to enable an accumulator to have a large capacity by increasing the compression ratio of gas with increased gas capacity of the bladder and to distribute heat generated in welding mainly to the vessel, which has low resistance to heat conduction to thereby avoid heat conduction from the bladder supporting ring to the bladder, thus to protect the bladder from being injured by heat.

The most suitable construction to achieve the above objects is as follows.

The upper peripheral edge of a cup shape vessel body and the lower peripheral edge of a cup shape lid are welded edge to edge and therein is placed an elastic bladder having its upper end open, then the welded portion and the upper end of the bladder are connected with a bladder supporting ring. The lower cylindrical fitting portion of the bladder supporting ring is received in a recess in said welded portion, and a flange on the bladder is confined in a bladder supporting groove at the upper portion of the supporting ring. The cylindrical portion of the lower end of the bladder supporting ring and the upper bladder supporting groove at the upper end of the ring are connected by an upwardly tapering frustoconical portion of the bladder supporting ring.

Other objects and advantages of the present invention will be more apparent as the description proceeds with reference to the accompanying drawings in which.

Figure 1:
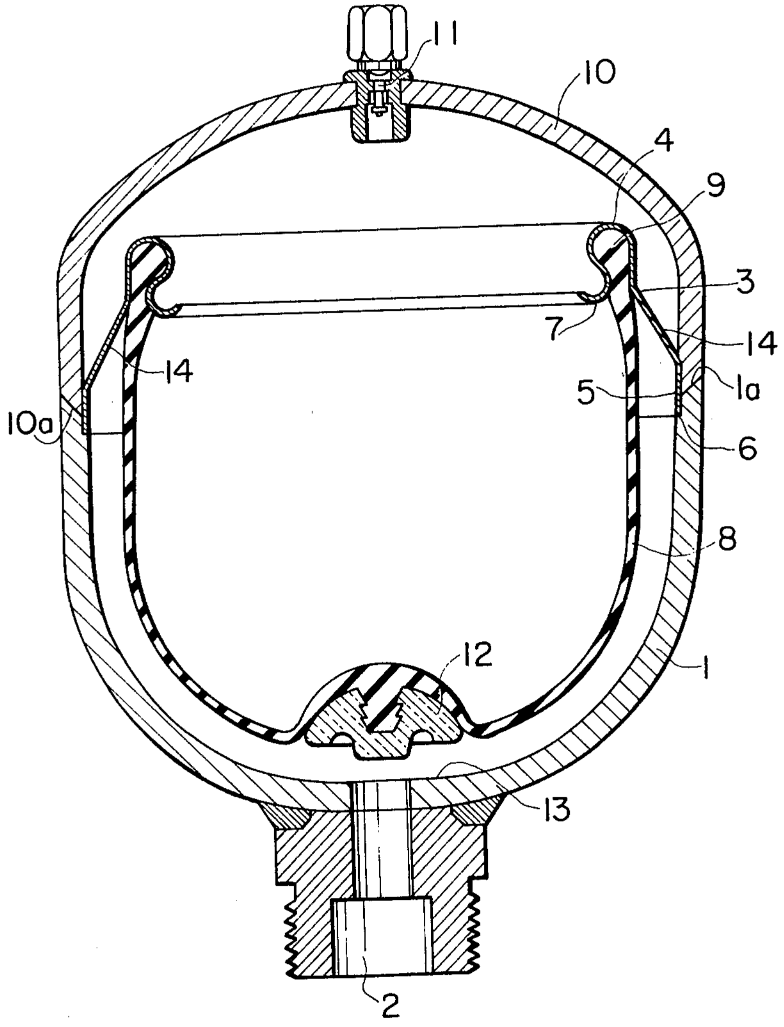
FIG. 1 is a longitudinal cross section of an accumulator of the present invention.
Figure 2:
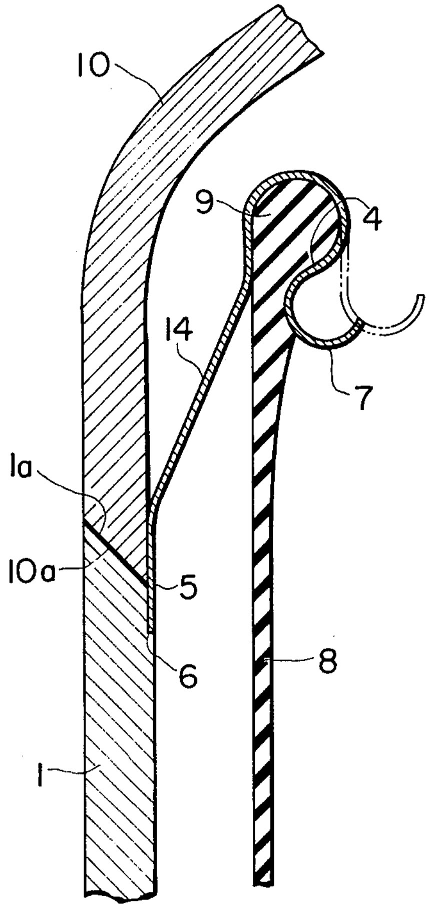
FIG. 2 is a partial enlarged cross section of the above.
Figure 3:
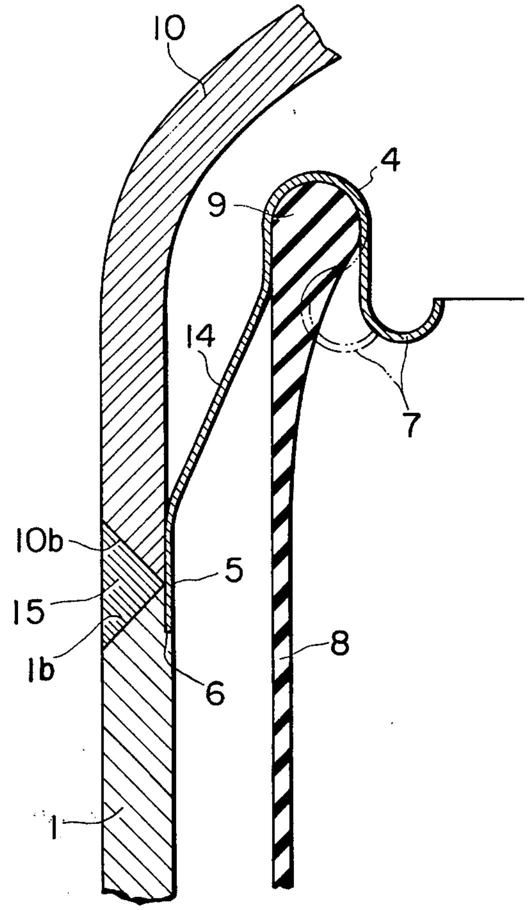
FIG. 3 is a partial enlarged cross section of another embodiment, the part shown corresponding to the part of the first embodiment that is shown in FIG. 2.

In FIG. 1, 1 is a cup shaped body of a vessel made of metal suitable to support the pressure to be used and having a liquid port in the center of its bottom. The upper edge of it is finished to be beveled toward the inside as seen at 1*a* in FIG. 1 and 2. 3 is a bladder holding metal ring made of thin steel or the like, which can be made as a stamping, having a groove 4 formed at its upper portion for receiving the flanged portion of a bladder, and the middle portion 14 of the ring is substantially frustoconical, tapering upwardly. The lower end of the ring forms a fitting portion 5 adjacent to the vertical wall of the body 1. The lower half of the ring is received in a recess 6 in the body, near its edge. The upper end portion of the ring 3 is bent in a curl 7 that extends from said flange holding groove 4. This is so formed that the bladder will not be damaged when it floats upward. 8 is a deformable bladder made of natural or synthetic rubber, and its upper open end is formed as a flange 9 which is inserted in the bladder holding groove 4 to secure the bladder. The bent portion 7 of the ring is squeezed to the groove 4 as from the broken line to the solid line as seen in FIG. 2 whereby the bladder is airtightly secured. 10 is a lid of the same material as the vessel body, having an air valve 11 at its top. If the lid is used as transfer barrier, an air port may be provided. Its lower end is outwardly beveled as at 10*a* to mate with the inwardly beveled face 1*a* of the vessel body 1 in the event the lid is to be secured to the body by electron beam welding. When ordinary welding is to be used, the outwardly beveled face 10*b* is finished to the lower end of the lid as seen in FIG. 3 so that a welding groove 15 is formed between it and the outwardly beveled face 1*b* of the upper end of the body 1. 12 is a valve provided at the bottom of the bladder 8. When the bladder expands, it contacts the valve seat 13 to close the liquid port 2 and when the bladder 8 contracts, it gets away from the seat 13 to open the port 2.

Now explanation is made to the method of assembling the accumulator of the present invention.

Firstly, the flange 9 of the bladder 8 is inserted in the flange holding groove 4 of the bladder supporting ring 3. Then with pressing machine or the like, the inner wall of the flange holding groove 4 shown by the broken line in FIG. 2 is pressed inwardly as seen by the solid line in the same Figure. Thereby the inner wall of the groove 4 gets under the flange 9 to rigidly secure it. Thus this portion is kept completely airtight. Under this state, as the bladder 8 would not separate from the ring 3 even when any pulling force is imparted, the fitting portion 5 at the lower part of the bladder holding ring 3 is inserted in the opening of the vessel body 1 and its lower end is supported in the recess 6. Then as the lid 10 is placed on the vessel body 1, the lid 10 is guided by the fitting portion 5 to be correctly aligned with the vessel body 1. The lid is temporarily supported on the body, as seen in FIG. 1 and 2 and with the edges of lid 10 and body 1 close to each other, electro-beam welding will be done or as seen in FIG. 3, a welding bead 15 will be formed by ordinary electric or gas welding at this portion. After welding, the cylindrical fitting portion 5 serves as a metal liner for the welding. Moreover since heat generated in welding is not transferred to the bladder 8 due to high resistance against heat conduction of the fitting portion 5 and the frustoconical portion 14, the bladder 8 is prevented from being injured by heat. Therefore in welding the body 1 and lid 10, the bladder can be securely kept at the fixed position in the accumulator without any damage with heat. Yet in this instance, since the guide portion 5 is at the inside of this welding portion, it can protect the bladder 8 at the time of welding from welding produced residue or the like jumping into the vessel. Also at the time of welding the body 1 and lid 2, as the guide portion 5 too is welded together keeping airtight there is no need to provide a particular securing means for only supporting the bladder 8 against the body 1 and lid 10. Also in this accumulator, since the bladder 8 is supported by inserting its flange 9 into the holding groove 4 of the bladder holding ring 3 and then the groove 4 is inwardly pressed, the supporting of the bladder 8 is made only with a single holding ring 3, any other member is not needed to support the bladder 8 for the body 1 and lid 10. Therefore, the structure of the accumulator is very simple and mounting of the bladder 8 to the body 1 can be easily performed by only inserting the guide portion 5 of the holding ring 3 to the body 1. Further in this accumulator, since the flange 9 of the bladder is being pressedly pinched in the supporting groove 4 of the ring, the bladder is firmly secured so that even when a large pulling force is imparted thereto, it never separates from the ring 3, and also, since the flange 9 serves as a packing, there is no leaking even when high pressure gas or liquid is applied. Moreover in this accumulator, since the bladder holding ring 3 projects from the body 1 up into the lid 10 with its upper end holding the bladder 8, gas capacity of the bladder 8 is greatly increased so that compared with the conventional bladders, its compression ratio is remarkably increased even with substantially the same gas capacity and enables a large increase of discharging volume of liquid. Thus an accumulator reliable in security and of high capacity comes to be manufactured at low cost giving a great contribution to industrial field.

What is claimed is:

1. A hydraulic accumulator of the type that comprises a rigid, hollow vessel having its interior divided by a resilient bladder into a gas compartment and a liquid compartment that are sealed from one another, said vessel having a port through which liquid under pressure can flow into and out of said liquid compartment to be maintained under pressure by gas in the gas compartment, said accumulator being characterized by:

A. said vessel comprising a lower bowl-shaped body member and an upper bowl-shaped lid member, which members have their edges sealingly connected with one another;

B. said bladder
   1. being bowl-shaped and
   2. when in relaxed condition being mostly located in the body member with its concave surface facing upwardly, and
   3. having an increased thickness portion all around its edge that defines a circumferential flange; and C. said bladder being secured in the vessel by means of a securement ring having
   1. a large diameter bottom portion that is sealingly received in a radially inwardly opening circumferential recess in the edge portion of the body member,
   2. a top portion that is curled radially inwardly and downwardly upon itself all around the ring to define a groove in which said flange is sealingly received, said top portion being of substantially smaller diameter than said bottom portion to support the relaxed bladder completely out of contact with the interior surface of the vessel; and
   3. a medial portion that coaxially connects said top and bottom portions and tapers axially upwardly and radially inwardly from said bottom portion to said top portion to dispose the top portion at a substantial distance above the connected edges of said body and lid members.

2. A hydraulic accumulator of the type that comprises rigid upper and lower bowl-shaped members coaxially connected edge-to-edge to define a vessel, a bowl-shaped bladder in said vessel for dividing its interior into a gas chamber and a liquid chamber that are sealed from one another, and a substantially rigid annular supporting member having a radially outer portion that coaxially engages an inner surface of one of said bowl-shaped members, all around the same, and a bladder engaging portion defining a circumferential groove which opens in one axial direction and in which the edge portion of the bladder is confined with a tight sealing fit, said accumulator being characterized by:

A. one of said bowl-shaped members having an abruptly increased inside diameter adjacent to its edge, whereby a radially inwardly opening circumferential recess is defined in the interior of that bowl-shaped member, in which recess the radially outer portion of said supporting member is sealingly received;

B. the bladder engaging portion of said supporting member
   1. being bent radially inwardly and axially back upon itself to define said groove in which the edge portion of the bladder is confined, and
   2. being of substantially smaller diameter than said radially outer portion thereof, to so support the bladder that when it is relaxed, all portions of the bladder are spaced from the interior surface of the vessel; and C. said supporting member having a radially intermediate portion which extends between its outer portion and its bladder engaging portion to maintain said portions coaxial and which cooperates with the bladder in dividing the interior of the vessel into gas and liquid chambers.

3. The accumulator of claim 2 wherein a lower one of said bowl-shaped members has a substantially coaxial liquid port in its bottom and wherein said bowl-shaped bladder has its concave interior surface facing axially upwardly, further characterized by:

D. said radially intermediate portion of the supporting member being tapered upwardly and radially inwardly, so that the bladder engaging portion is at a level substantially above the radially outer portion of the supporting member and thus the bladder has its edge near an upper axial end of the vessel and its closed lower end near a lower axial end of the vessel.

4. The accumulator of claim 3 wherein said bladder supporting member is formed of one piece of sheet metal and wherein the other of said bowl-shaped members cooperates with said one bowl-shaped member to confine the radially outer portion of the bladder supporting member against axial displacement relative to the vessel, further characterized by:

E. said radially outer portion of the bladder supporting member being substantially cylindrical and projecting edgewise downwardly from the lower edge of the radially intermediate portion of the bladder supporting member.

5. The accumulator of claim 4, further characterized by:

F. a radially innermost portion on said bladder supporting member that is curled radially inwardly and axially upwardly all around the bladder supporting member to provide a smoothly rounded surface against which the bladder can engage as it is flexed axially upwardly.

* * * * *